United States Patent [19]

Nagaura et al.

[11] Patent Number: 4,770,960

[45] Date of Patent: Sep. 13, 1988

[54] ORGANIC ELECTROLYTE CELL

[75] Inventors: Toru Nagaura; Toshio Hashimoto, both of Fukushima, Japan

[73] Assignee: Sony Corporation, Tokyo, Japan

[21] Appl. No.: 43,039

[22] Filed: Apr. 27, 1987

[30] Foreign Application Priority Data

Apr. 30, 1986 [JP] Japan ................................. 61-98116
May 12, 1986 [JP] Japan ................................. 61-108157

[51] Int. Cl.⁴ ........................ H01M 6/16; H01M 4/48
[52] U.S. Cl. .................................. 429/194; 429/218; 252/182.1; 423/594
[58] Field of Search ........................ 429/194, 197, 218; 252/182.1, 518; 423/594, 593

[56] References Cited

U.S. PATENT DOCUMENTS

| | | | |
|---|---|---|---|
| 4,049,887 | 9/1977 | Whittingham | 429/112 |
| 4,302,518 | 11/1981 | Goodenough et al. | 429/194 X |
| 4,357,215 | 11/1982 | Goodenough et al. | 204/2.1 |
| 4,391,729 | 7/1983 | Liang et al. | 429/194 X |
| 4,489,144 | 12/1984 | Clark | 429/218 X |
| 4,497,726 | 2/1985 | Brule et al. | 429/218 X |
| 4,567,031 | 1/1986 | Riley | 423/593 |

FOREIGN PATENT DOCUMENTS 0017400 10/1980 European Pat. Off. .
2030352 4/1980 United Kingdom .
2033138 5/1980 United Kingdom .
2087858 6/1982 United Kingdom .

OTHER PUBLICATIONS

Ferrites, Proceeding of International Conference, 1980, pp. 425-428.
Patent Abstract of Japan, vol. 9, No. 263.
Journal of Power Sources, vol. 14, No. 1/3, Jan./Mar. 1985, pp. 231-234.
Journal of Power Sources, vol. 7, No. 1, Nov., 1981, pp. 1-43.
Mat. Res. Bulletin, vol. 15, 1980, pp. 783-789.

Primary Examiner—Anthony Skapars
Attorney, Agent, or Firm—Hill, Van Santen, Steadman & Simpson

[57] ABSTRACT

An organic electrolyte cell is disclosed which comprises an anode made of Li or Li alloy, an organic electrolyte and cathode active material made of Li and metal complex oxide represented by $LiMO_2$ wherein M stands for at least one of Co, Ni, Fe, Cr, and V. The cell has a discharge voltage of 1.2 to 1.3 volts which is compatible with mercury cell.

1 Claim, 8 Drawing Sheets

ORGANIC ELECTROLYTE CELL

BACKGROUND OF THE INVENTION

1. Field of the Invention

The present invention relates to an organic electrolyte cell using lithium or lithium alloy as the anode, liquid organic electrolyte and cathode material.

2. Prior Art

Recently, in association with the miniaturization of various electronic equipment such as timepiece, cameras or electronic calculators, silver oxide or mercury cells that are small in size and thickness and having high energy density among the aqueous solution cells are being used.

However, with our increased interest in environmental pollution problems, since not only mercury cells but also the silver oxide cells make use of zinc amalgam as the cathode, it is feared that disposal of used mercury and silver oxide cells may cause additional environmental pollution.

Under these circumstances, possible debut of the pollution free cells interchangeable with mercury of silver oxide cells is strongly desired.

On the other hand, lithium cells using lithium or alloy as the cathode and an organic liquid electrolyte as the liquid electrolyte is superior in storage properties, can be reduced in size and thickness because of its high energy density, while it is pollution-free in that it does not make use of mercury, so that it is tentatively used in a variety of electronic devices. For example, lithium cells using $MnO_2$, $CF_x$ and $AgCrO_4$ as the anode active material are finding practical application.

However, because of its higher cell voltage of 3V, the lithium cell is not fully satisfactory in its interchangeability with the conventional mercury of silver oxide cells. It has been tried to evolve lithium cells interchangeable with these silver oxide or mercury cells and there has been proposed a lithium cell using FeS, $FeS_2$ or CuO as the cathode active material in combination with the lithium anode. This lithium cell has a cell voltage of 1.5 to 1.6V and thus approximately equal to that of the silver oxide cell so that the interchangeability with the silver oxide cell is assured. However, the mercury cell has a lower cell voltage of 1.3V, such that there lacks up to now a lithium cell fully interchangeable with the mercury cell.

OBJECT AND SUMMARY OF THE INVENTION

Accordingly, it is an object of the present invention to provide an organic electrolyte cell which is free from mercury.

It is another object of the present invention to provide an organic electrolyte cell having voltage which is compatible with mercury cell.

It is further object of the present invention to provide an organic electrolyte cell having increased cell capacity.

According to one aspect of the present invention there is provided an organic electrolyte cell which comprises an anode made of lithium or lithium alloy, an organic electrolyte, and cathode containing cathod active material made of Li and metal complex oxide represented by $LiMO_2$ wherein M stands for at least one of Co, Ni, Fe, Cr and V. In further aspect of the present invention there is provided an organic electrolyte cell having a cathode active material made of $LiCo_{1-x}NiO_2$.

BRIEF DESCRIPTION OF THE DRAWINGS

FIG. 7B that for $LiNi_{0.2}Co_{0.8}O_2$; FIG. 7C that for $LiNi_{0.4}Co_{0.6}O_2$; FIG. 7D that for $LiNi_{0.6}Co_{0.4}O_2$; FIG. 7E that for $LiNi_{0.8}Co_{0.2}O_2$.

DESCRIPTION OF THE PREFERRED EMBODIMENTS

Since the cell voltage is determined by its cathode and anode material, the present inventors have investigated into various cathode materials in combination with the anode lithium. As the result, we have found a material exhibiting an electrical voltage approximately equal to the working voltage of the mercury cell (1.2 to 1.3V). Thus the organic electrolyte cell of the present invention is characterized in that it is constituted by an anode of lithium or lithium alloy, a cathode formed of a complex metal oxide represented by $LiMO_2$ where M stands for one or two or more of Co, Ni, V, Cr and Fe, and an organic electrolyte.

The complex metal oxide is a complex oxide of Li and transition metals and, for example, $LiCoO_2$, $LiFeO_2$, $LiCrO_2$ and $LiVO_2$ are used. As these complex metal oxides, the complex metal oxides represented by the general formula $LiM^1O_2$ $LiM^2O_2$ where $M^1$ stands for one of transition metals such as V, Cr, Co, Ni or Fe and $M^2$ stands for transition metals different from $M^1$ by itself or a mixture of $LiM^1O_2$ and $LiM^2O_2$, may be used. It is also possible to use complex metal oxide represented by $Li(M^1)_x(M^2)_{1-x}O_2$, where $0<x<1$. The aforementioned complex metal oxide may be produced easily by mixing and heat treating carbonates of Li and carbonates of the transition metal. For example, it may be produced by heat treating $LiCoO_2$ and $CoCO_3$ in air at 900° C.

As the anode active material, an alloy of Li with one or more of Al, Pb, Sn, Bi and Cd, such as LiAl alloy, may be used in addition to lithium.

As the electrolyte solution, a non-aqueous organic electrolyte of a lithium salt dissolved in an organic solvent may be used.

The organic solvent includes esters, ethers, 3-substituted-2-oxazolidine, or a mixed solvent consisting of two or more of these solvents.

The esters may include alkylene carbonates (ethylene carbonates, propylene carbonates or $\gamma$-butyrolactones).

The ethers may include cyclic ethers, such as 5-membered ethers tetrahydrofuran; substituted (alkyl, alkoxy) tetrahydrofuran, such as 2-methyltetrahydrofuran, 2,5-dimethyltetrahydrofuran, 2-ethyltetrahydrofuran, 2,2'-dimethyltetrahydrofuran, 2-methoxytetrahydrofuran, or 2,5-dimethoxytetrahydrofuran; or dioxolane, 6-membered ethers 1,4-dioxane, pyran, dihydropyran, or tetrahydropyran, or dimethoxyethane.

The 3-substituted oxazolidinones include 3-alkyl-2-oxazolidinones (such as 3-methyl-2-oxazolidinone, or 3-ethyl-2-oxazolidinone); 3-cycloalkyl-2-oxazolidinones (such as 3-cyclohexyl-2-oxazolidinone), 3-aralkyl-2-oxazolidinones (such as 3-benzyl-2-oxazolidinone), or 3-aryl-2-oxazolidinone (3-phenyl-2-oxazolidinone).

Above all, propylene carbonates or 5-membered ethers (above all, tetrahydrofuran, 2-methyltetrahydrofuran, 2-ethyltetrahydrofuran, 2,5-dimethyltetrahydrofuran, or 2-methoxytetrahydrofuran), or 3-methyl-2-oxazolidinone.

As the electrolyte, lithium perchlorate, boron lithium fluoride, phosphorus lithium fluoride, lithium aluminate chloride, or trifluoromethane lithium sulfonate. Of these, lithium perchlorate or boron lithium fluoride is preferred.

The cathode material that has brought the present invention to completion is a complex oxide of lithium and the transition metal (M) represented by the chemical formula $LiMO_2$. The cell reaction is considered to proceed by the reaction schema shown by the formula (1), with the operating voltage being 1.2 to 1.3V.

(1)

That is, in the organic electrolyte cell of the present invention, the complex metal compound, the cathode material, is reduced to an oxidized state of the lower order, with the reaction proceeding from $M^{3+}$ to $M^0$. Taking an example of $LiCoO_2$, the reaction proceeds from $Co^{3+}$ to $Co^0$, as indicated by the formula $$LiCoO_2 + 3Li \rightarrow 2Li_2O + Co^0 \qquad (2).$$

The sample applies to the case of $LiNiO_2$, wherein $LiNiO_2$ is discharged such that $$LiNiO_2 + 3Li \rightarrow 2Li_2O + Ni^0 \qquad (3)$$

In this case, the cell voltage corresponds to the potential difference between $LiCoO_2$ and Li or between $LiNiO_2$ and Li is set to 1.2 to 1.3V.

Also, in the organic electrolyte cell of the present invention, the cell reaction between the cathode material $LiMO_2$ and the anode material Li proceeds in the three-electron reaction so that the theoretical capacity is as large as 821 mAH/g and 823 mAH/g, respectively, so that a cell of a large capacity is obtained.

Moreover, by charging, the oxidized state of a higher order, or the pre-charging state, may be obtained, as shown by the formula (4)

so that the cell may also be used as the secondary cell. Wherein using the cell as the secondary cell in this manner, the charging voltage is preferably kept so as to be not higher than 2.5V. If the charging voltage becomes excessive, the organic electrolyte tends to be decomposed.

The present invention will be explained with reference to certain specific examples. It is to be noted, however, that the present invention is not to be limited to these Examples.

EXAMPLE 1

Figure 1A:
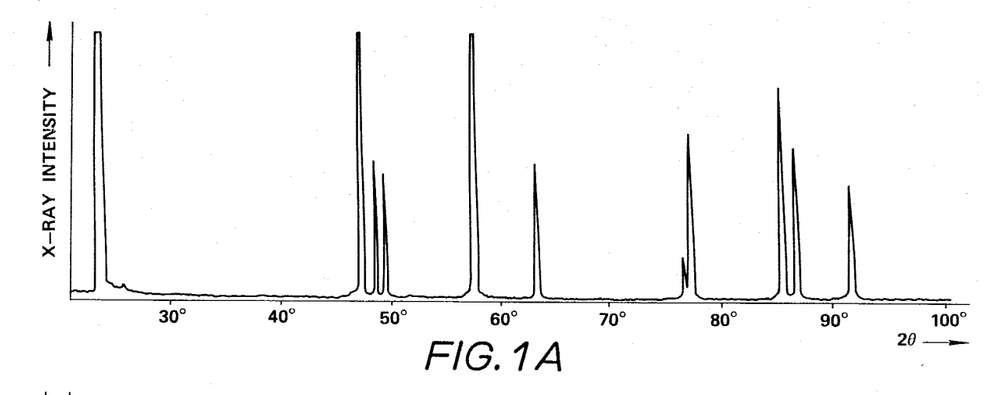
FIG. 1(A) is a diagram showing the X-ray diffraction pattern for $LiCoO_2$ and FIG. 1(B) is a diagram showing the X-ray diffraction pattern of $LiNiO_2$.

36.9 g of marketed lithium carbonate and 118.9 g of powdered cobalt carbonate were mixed thoroughly and calcined at 900° C. for 5 hours in air. On examination by an X-ray diffraction, the calcined product showed a diffraction pattern shown as at (A) in FIG. 1 and thus in meeting with the diffraction pattern of $LiCoO_2$.

Figure 1B:
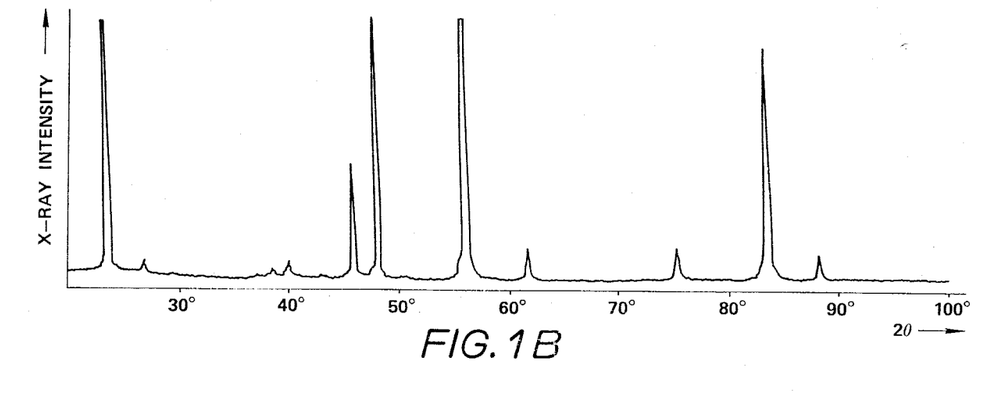

Similarly, powdered lithium carbonate and powdered nickel carbonate were mixed together thoroughly at a ratio that will give an atomic ratio of lithium to nickel of 1:1 and the resulting mixture was calcined in air at 900° C. for 5 hours. On examination by X-ray diffraction, the calcined product showed a diffraction pattern shown at (B) in FIG. 1 and thus in meeting with the diffraction pattern of $LiNiO_2$.

Each 70 wt. parts of the $LiCoO_2$ and $LiNiO_2$ powders obtained in this manner was taken and admixed with each 27 wt. parts of graphite and 3 wt. parts of teflon to produce pellets weighing 0.108 g and having a diameter of 10.3 mm and a thickness of 0.5 mm.

Figure 2:
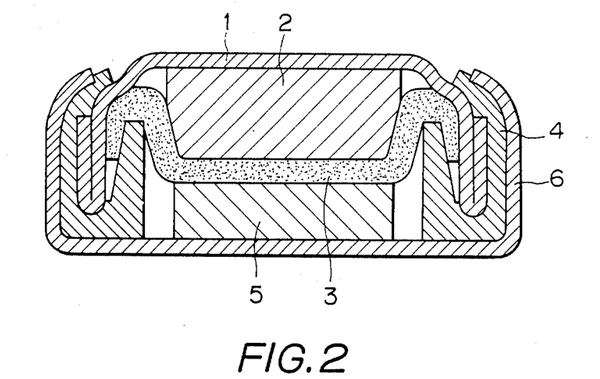
FIG. 2 is an enlarged sectional view showing an example of the structure of the organic electrolyte cell.

Then, as shown in FIG. 2, a lithium foil (2) 1.6 mm thick was punched to a diameter of 12.3 mm on an anode cup (1) and pressed. A separator (3) was placed thereon, a plastic gasket (4) was fitted, a propylene carbonate solution with $LiClO_4$ dissolved as an electrolyte solution at a rate of 1 mol/lit. was injected, the pellets (5) of $LiCoO_2$ and $LiNiO_2$ were placed as the cathode on the separator (3), the cathode can (6) was placed and the end sealed by caulking to produce the $Li/LiCoO_2$ cell and $Li/LiNiO_2$ cell.

Figure 3:
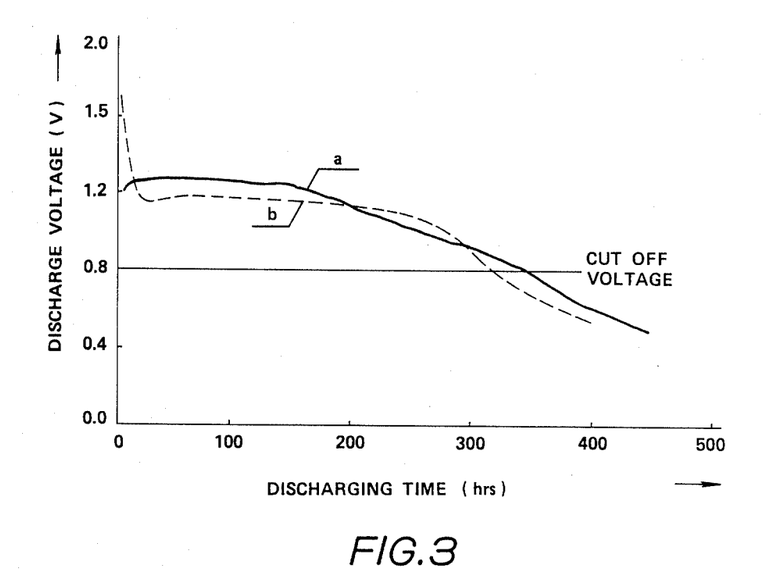
FIG. 3 is a diagram showing discharge characteristics for the case of using $LiCoO_2$ of $LiNiO_2$ as the cathode pellet.

These cells were discharged through a constant resistor of 6.5 kiloohms for examining the discharge curve. The results are shown in FIG. 3. It is seen that the $Li/LiCoO_2$ cell, with the discharge curve shown by a curve a in FIG. 3, and the $Li/LiNiO_2$ cell, with the discharge curve shown by a curve b in FIG. 3, show the discharge voltage in the vicinity of 1.2V.

The present inventors have stated that the new cell active material reacts as shown by the schema (1).

This can be supported by the present example.

Thus, assuming that $LiCoO_2$ reacts by the formula (2), the theoretical capacity of $LiCoO_2$ is equal to 821 mAH/g.

Since 0.076 g of LiCoO$_2$ is contained in the LiCoO$_2$ pellet provided in the present Example, the theoretical cathode capacity of the Li/LiCoO$_2$ cell of the present Example is 62.4 mAH.

An amount of lithium equivalent to 1950 mAH is used in the anode of the cell, and the capacity of the cell obtained by the actual discharge is controlled by the reaction of the lesser capacity electrode of the cathode LiCoO$_2$. In sum, it is obtained as the capacity of the cell of the present Example equal the cathode capacity.

The capacity of the cell of the present Example shown in FIG. 3 up to the terminal voltage of 0.8V for the discharging through 6.5 kiloohms resistance is 60.1 mAH for the Li/LiCoO$_2$ cell which is equal to 96.3% of the theoretical value of 62.4 mAH and thus close to such theoretical value. In sum, this supports that the cell reaction proceeds by the reaction formula $$LiCoO_2 + 3Li \rightarrow 2Li_2O + Co \qquad (2)$$

which is based on the computation of the theoretical value.

Figure 4A:
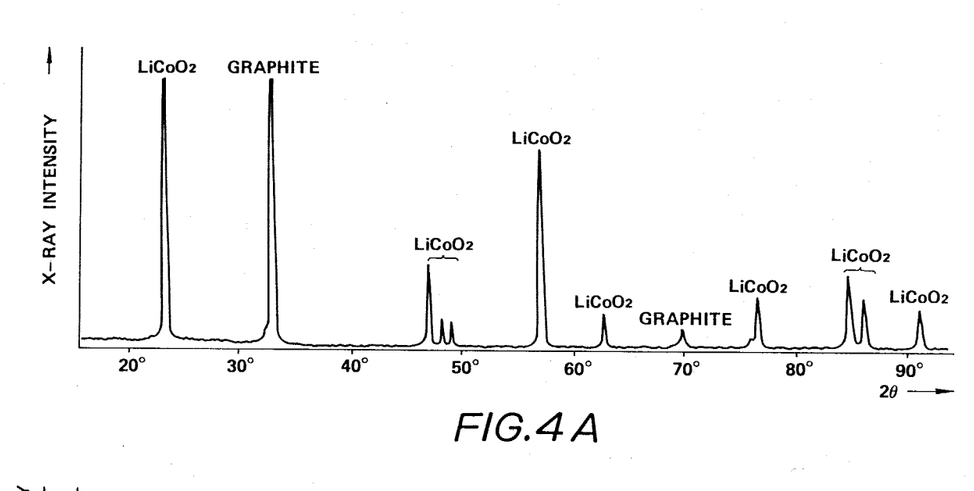
FIG. 4(A) is a diagram showing the X-ray diffraction pattern of the cathode pellet of the non-discharged cell in the case of using $LiCoO_2$ as the cathode pellet.
Figure 4B:
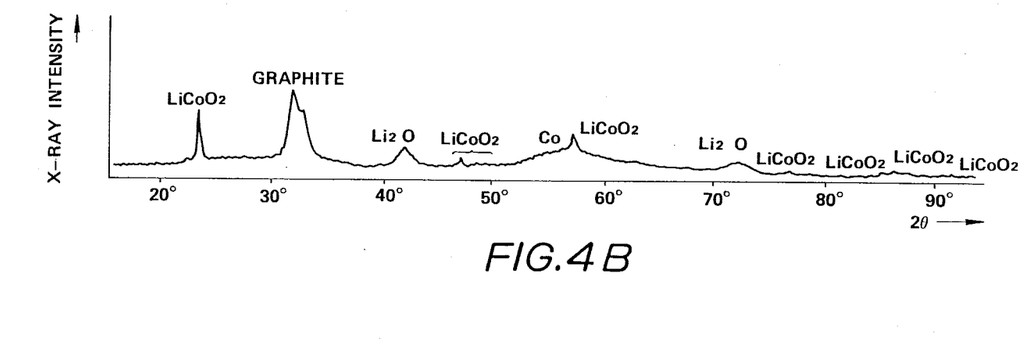
FIG. 4(B) is a diagram showing X-ray diffraction pattern of the cathode pellet after termination of discharge.

The discharged cell was dismantled and the discharge product at the cathode was checked by the X-ray diffractometry. As shown at (B) in FIG. 4, the LiCoO2 peak is decreased as compared with the X-ray diffraction pattern at the cathode of the undischarged cell shown at (A) in FIG. 4. This indicated that the LiCoO$_2$ peak is decreased while the high Li$_2$O diffraction peak appears for the first time.

Also a broad diffraction peak appears in the vicinity of $2\theta = 46$ to 57, which seems to show that the metal cobalt has been precipitated in an amorphous state.

The reaction schema is also supported by the above reaction product.

Although the description has been made above in connection with the lithium cobalt complex oxide, the same may be said of the lithium nickel oxide.

EXAMPLE 2

88.7 wt. parts of LiCoO$_2$ powder obtained as in Example 1 was mixed with 9.3 wt. parts of the graphite as the electrically conductive material and 2.0 wt parts of Teflon powders as the binder, the mixture then being cast to an cathode pellet having a diameter of 7.8 mm and a thickness of 2.25 mm.

An anode was then produced by punching and pressing a lithium foil 2.36 mm thick to an outside diameter of 7.8 mm on an anode cup. On the lithium was placed a separator and the cell with the outside diameter of 11.5 mm and the thickness of 5.3 mm was assembled by the same procedure as in the Example 1. This cell has the same size as the marketed mercury cell (MR 44) and the terminal discharge end of the cell is set to be determined by the Li amount.

Figure 5:
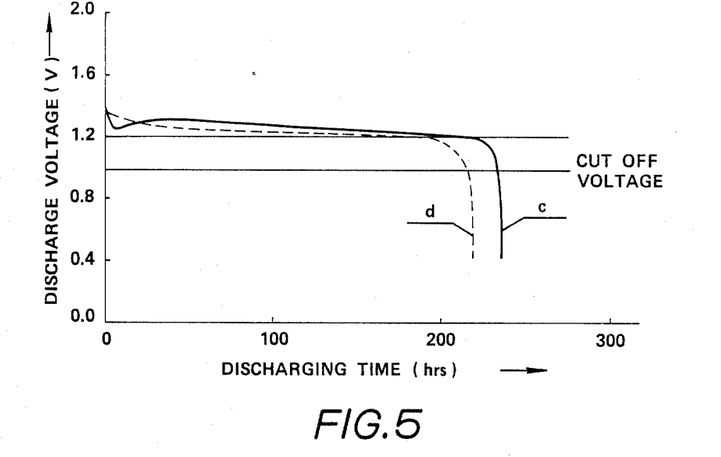
FIG. 5 is a diagram showing the discharge characteristics of the cell using $LiCoO_2$ as the cathode in comparison with those of the mercury cell.

As this cell was discharged through a resistance of 1300 ohms, a discharge of 235 hours could be obtained up to the cutoff voltage of 1.0V. When the marketed mercury cell (MR 44) discharged under the same condition, discharge of 215 hours was obtained, the results are shown in FIG. 5. In FIG. 5, the curve c stands for the discharge curve of the cell of the present Example, while the curve d stands for the discharge curve of the mercury cell. The cell of the present Example has the discharge voltage almost equal to that of the mercury cell and the discharge capacity larger than that of the conventional mercury cell.

EXAMPLE 3

Figure 6:
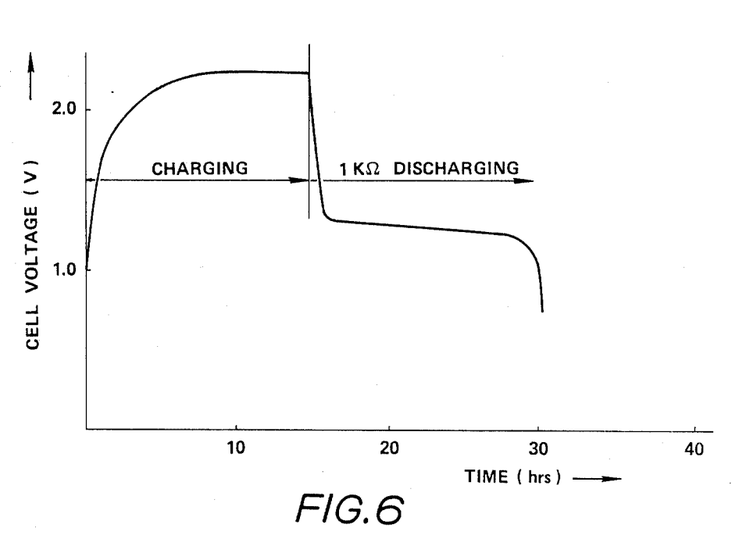
FIG. 6 is a diagram showing charging and discharging curves of the $LiCoO_2$ cell.

The cell prepared by the Example 1 was discharged to a sufficient depth (up to 0.8V) through the resistance of 6.5 kiloohms, then charged for 15 hours at the constant voltage of 2.25V and again discharged through a resistance of 1 kiloohm. As seen from FIG. 6, it was found that discharge is again possible. It was ascertained that the discharge performance to the same extent as that shown in FIG. 6 could be obtained after repeating the charging and discharging for more than 10 times.

The Li/LiCoO$_2$ cell can be used in this manner as the secondary cell.

In the above, detailed description up to Example 3 has been made with the LiCoO$_2$ as the lithium cobalt complex material. LiCoO$_2$ basically belongs to a transition metal lithium oxide LiMO$_2$ having the layered Rocksolt structure and the compound of the same structure is obtained for M=V, Cr, Co, Ni and Fe. In short, the Co atom of LiCoO$_2$ can be easily replaced in part by these elements to provide the same structure.

The present inventors have substituted cobalt atoms of LiCoO$_2$ in the following Example in part by nickel of the above elements and produced satisfactory lithium cell with this material, as explained below.

SYNTHESIS EXAMPLE OF COMPLEX OXIDES

The commercially available lithium carbonate powders and cobalt carbonate powders were mixed together to give a lithium atom to cobalt atom ratio of 1:1 and the mixture was calcined in air at 900° C. for 5 hours to a lithium-cobalt complex oxide (LiCoO$_2$). FIG. 1A shows the X-ray diffraction pattern of the produced lithium cobalt complex oxide.

Then, to replace the cobalt atoms of the lithium cobalt complex oxide by nickel atoms, lithium carbonate (LiCO$_3$), cobalt carbonate (CoCO$_3$) and nickel carbonate (NiCO$_3$) were mixed to conform to a composition of LiNi$_x$Co$_{1-x}$O$_2$ and calcined. That is, for various values of x, mixing and calcining were so performed that the lithium atoms, nickel atoms and cobalt atoms obey the ratio of 1:x:1−x. The calcining conditions were 900° C. for 5 hours in air, as in the case of the lithium cobalt complex oxides.

Figure 7A:
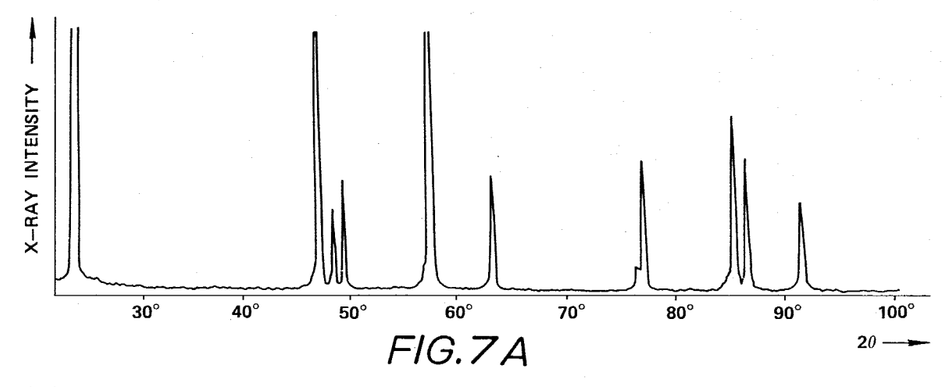
FIGS. 7A to 7E are spectral diagrams showing the X-ray diffraction patterns when the value of x in $LiNi_xCo_{1-x}O_2$ is changed stepwise from 0 to 1, wherein FIG. 7A that for $LiNi_{0.1}Co_{0.9}O_2$.
Figure 7B:
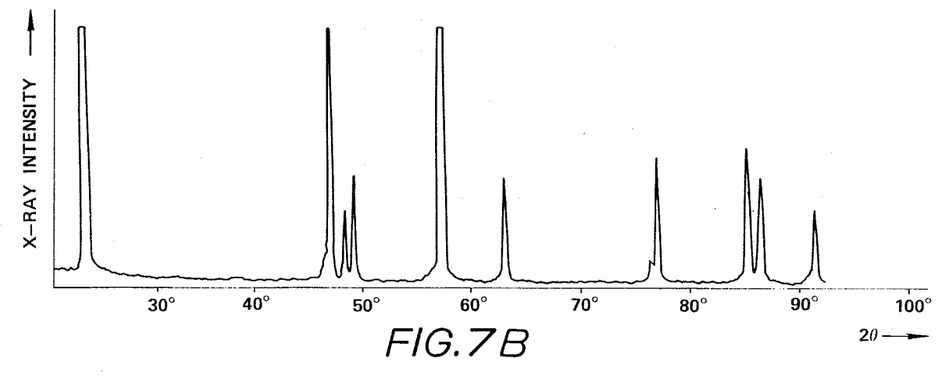
Figure 7C:
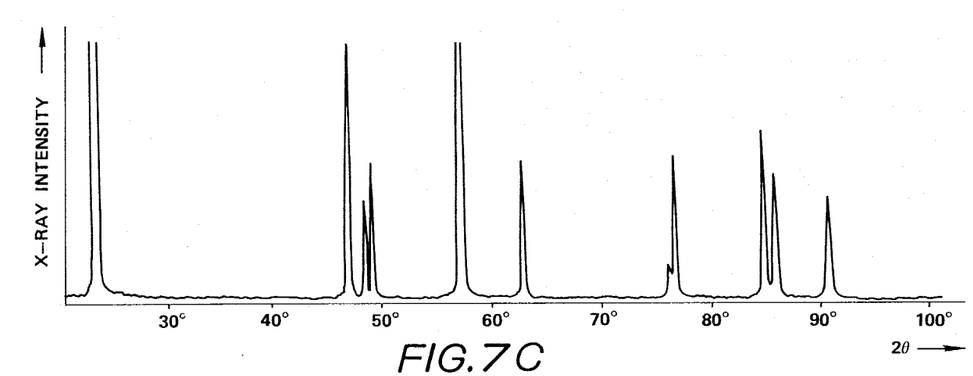
Figure 7D:
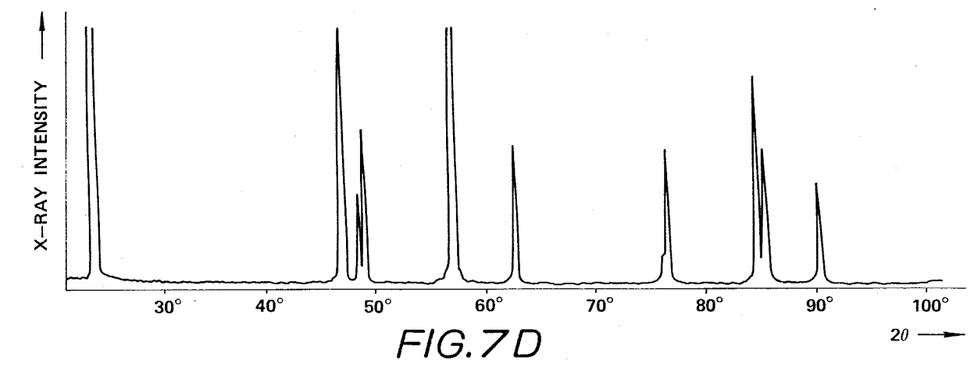
Figure 7E:
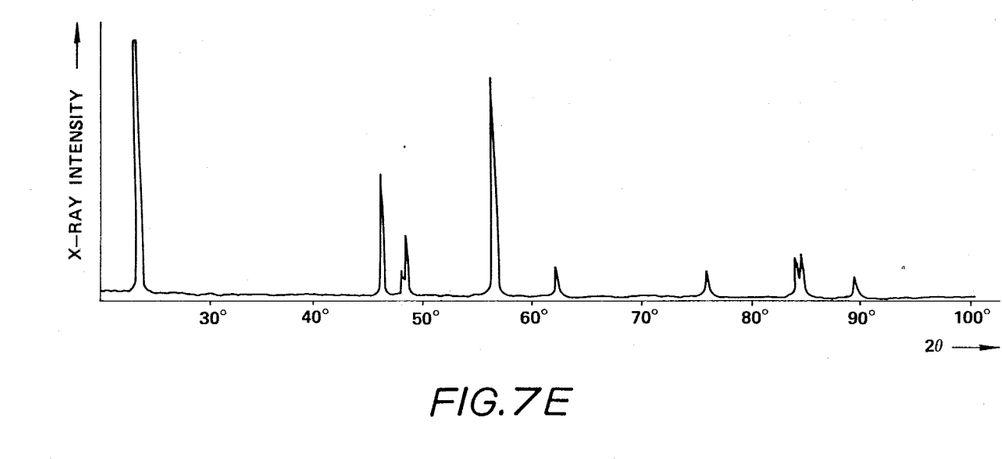

FIGS. 7A to 7E show the X-ray diffraction patterns for these complex oxides. Thus, FIG. 7A shows LiNi$_{0.1}$Co$_{0.9}$O$_2$; FIG. 7B shows LiNi$_{0.2}$Co$_{0.8}$O$_2$; FIG. 7C shows LiNi$_{0.4}$Co$_{0.6}$O$_2$; FIG. 7D shows LiNi$_{0.6}$Co$_{0.4}$O$_2$; and FIG. 7E shows LiNi$_{0.8}$Co$_{0.2}$O$_2$.

It is seen from the X-ray diffraction pattern shown in these FIGS. 1A, 1B and 7A to 7E that cobalt and nickel can be replaced by each other in LiNi$_x$Co$_{1-x}$O$_2$ at a free ratio. It is because the basic pattern of LiCoO$_2$ for x=0 (FIG. 1A) is not changed in accordance with the value for x, until the pattern of FIG. 1B of LiNiO$_2$ for x=1 is reached.

EXAMPLE 4

To 7.0 wt.parts of the powders of complex oxide LiNi$_x$CO$_{1-x}$O$_2$ (x=0-1) prepared in the preceding synthetic example for the complex oxide were mixed with 27 wt. parts of the graphite and 3 wt.parts of polytetrafluoroethylene powders as the binder, and the resulting powder mixture was compacted and formed to a cathode pellet 10.3 mm in diameter and 0.5 mm in thickness.

Then, as shown in FIG. 2, a lithium foil (2) 12.3 mm in diameter and 1.6 mm in thickness was punched and pressed onto an anode cup (1). On this was placed a separator (3) containing the electrolyte liquid, a plastic gasket (4) was fitted, the cathode pellet (5) was placed on the separator (3), assemble an organic electrolyte cell. As the electrolyte liquid, lithiumperchlorate dissolved in propylene carbonate at a rate of 1 mol/liter was used.

Figure 8:
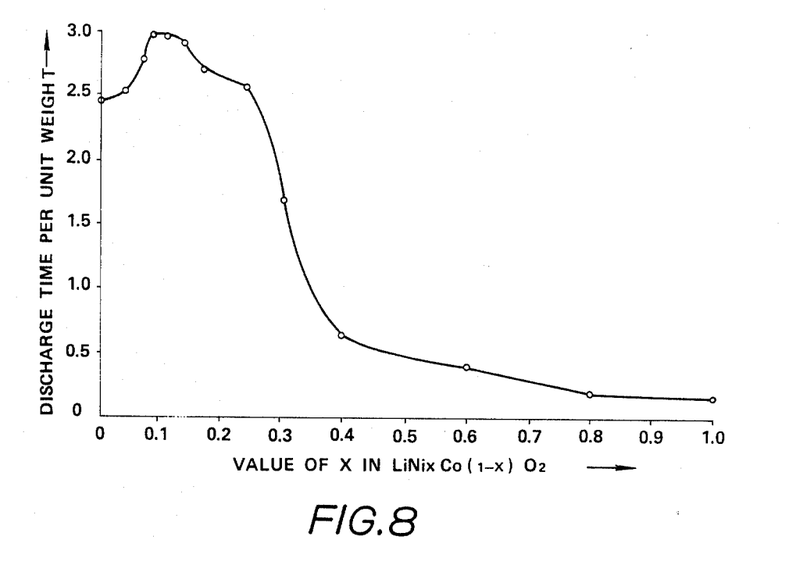
FIG. 8 is a diagram showing the relation between the value of x and the discharge time per unit weight for a cell having $LiNi_xCo_{(1-x)}O_2$ as the anode material.

These cells were discharged through a resistor of 6.5 kiloohms and the discharge time until the terminal voltage of 1.2V was measured to find the discharge time of the cathode material $LiNi_xCo_{1-x}O_2$ per unit weight (1 mg) The results are shown in FIG. 8.

It is seen from FIG. 8 that the discharge capacity of the cell using $LiNi_xCo_{1-x}O_2$ as the cathode material is changed with the value of x and that the discharge capacity is increased as compared to $LiCoO_2$ when part of cobalt is replaced by nickel. However, the capacity is decreased with the increase in the nickel contents for $x > 0.27$.

Thus it was proved in the present Example that the complex oxide consisting of lithium, cobalt and nickel $LiNi_xCo_{1-x}O_2$ is excellent as the cell active material and, above all, the oxide in which part of the cobalt atoms are replaced by nickel atoms by setting the value of x so that $0 < x \leq 0.27$ may prove to be an excellent cell active material in an organic electrolyte cell having the reaction of the formula $$LiMO_2 + 3Li \rightarrow 2Li_2O + M \quad (1)$$

wherein M represents a transition metal, as the basic cell reaction.

Figure 9:
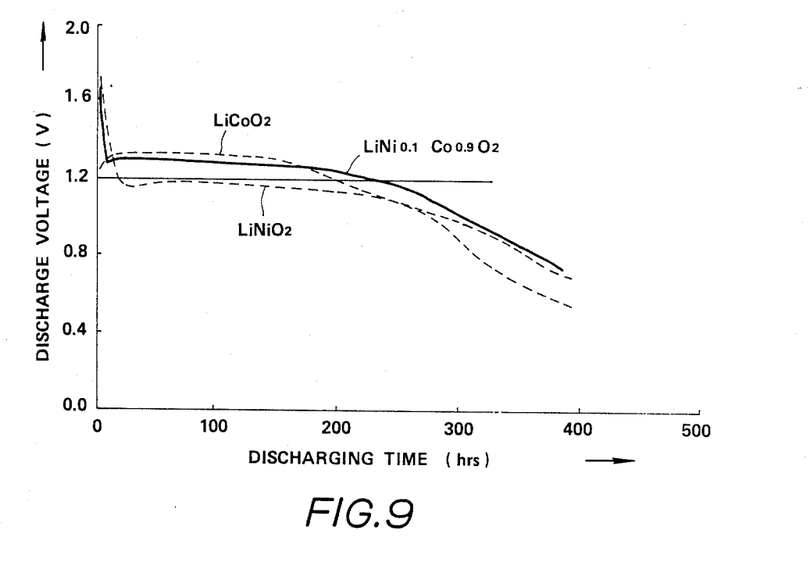
FIG. 9 is a diagram showing the discharge curve of the cell having $LiNi_{0.1}Co_{0.9}O_2$ as the anode material in comparison with the cell having $LiCoO_2$ as the anode material and the cell having $LiNiO_2$ as the anode material.

FIG. 9 shows the characteristics of the discharge curve of the $Li/LiNi_{0.1}Co_{0.9}O_2$ cell as compared to those of $Li/LiCoO_2$ cell and $Li/LiNiO_2$ cell, wherein the maximum value is indicated by the discharge capacity. The ascendancy of using $LiNi_xCo_{1-x}O_2$ as the cathode material may also be proved from FIG. 9. The cell having $LiCoO_2$ as the cathode material is satisfactory in regard to the discharge voltage, however, it is not fully satisfactory in regard to the discharge capacity. On the other hand, the cell having $LiNiO_2$ as the cathode material has a flat discharge curve and exhibits desirable properties in the cell life, however, it has a slightly low discharge voltage such that the cell capacity can hardly be procured for a terminal voltage of 1.2V.

On the other hand, the cell having $LiNi_{0.1}Co_{0.9}O_2$ as the anode material showed satisfactory properties in both the discharge voltage and discharge capacity.

The mercury cell, having a desirably large capacity, poses a pollution problem because it makes use of a large amount of mercury and the disposal of the used cells causes difficulties. However, these cells are still being used because of the absence of proper substitutes.

The present invention has realized a pollution-free lithium cell that is fully interchangeable with the mercury cell as to the operating voltage thereof. The present invention provides a novel cell system wherein a cathode lithium is combined with the anode lithium-transition metal complex oxide to realize a cell having an operating volgate of 1.2 to 1.3V and thus a totally equivalent voltage to that of the mercury cell. Rather, the cell capacity of the cell is larger than that of the mercury cell. In case, $LiCoO_2$ is used as the basic active material with part of the cobalt atoms thereof replaced by nickel atoms, the discharge capacity of the cell is increased significantly.

We claim as our invention:

1. An organic electrolyte cell comprising an anode made of a material chosen from the group consisting of Li and Li alloy, an organic electrolyte and cathode containing cathode active material made of Li and metal complex oxide represented by $LiCo_{1-x}Ni_xO_2$ wherein x is greater than 0 and less than or equal to 0.27 in atomic ratio, said cell showing discharge voltage derived by voltage difference of $LiCo_{1-x}Ni_xO_2$ and Li.

* * * * *